United States Patent
Wingen et al.

(10) Patent No.: US 6,605,323 B1
(45) Date of Patent: Aug. 12, 2003

(54) MONOSTABLE FERROELECTRIC ACTIVE MATRIX DISPLAY

(75) Inventors: Rainer Wingen, Hattersheim (DE); Barbara Hornung, Hasselroth (DE); Toshiaki Nonaka, Kakegawa (JP)

(73) Assignee: Aventis Research & Technologies GmbH & Co. KG, Frankfurt (DE)

( * ) Notice: Subject to any disclaimer, the term of this patent is extended or adjusted under 35 U.S.C. 154(b) by 0 days.

(21) Appl. No.: 09/719,037

(22) PCT Filed: Jun. 8, 1999

(86) PCT No.: PCT/EP99/03935

§ 371 (c)(1), (2), (4) Date: Apr. 23, 2001

(87) PCT Pub. No.: WO99/64537

PCT Pub. Date: Dec. 16, 1999

(30) Foreign Application Priority Data

Jun. 8, 1998 (DE) .......................................... 198 25 488

(51) Int. Cl.$^7$ ........................ C09K 19/34; C09K 19/32; C09K 19/30; G02F 1/141
(52) U.S. Cl. .............. 428/1.1; 252/299.61; 252/299.62; 252/299.63; 252/299.66; 349/168; 349/172
(58) Field of Search ....................... 428/1.1; 252/299.63, 252/299.61, 299.66, 299.62; 349/168, 172, 184, 185, 186

(56) References Cited

U.S. PATENT DOCUMENTS

| 4,367,924 A | 1/1983 | Clark et al. |
| 5,344,585 A | 9/1994 | Wingen et al. |
| 5,389,291 A | 2/1995 | Reiffenrath et al. |
| 5,630,962 A | 5/1997 | Schlosser et al. |
| 6,482,478 B1 * | 11/2002 | Wingen ...................... 428/1.1 |
| 6,482,479 B1 * | 11/2002 | Dubal et al. ................. 428/1.1 |

FOREIGN PATENT DOCUMENTS

| EP | 0 475 444 | 3/1992 |
| WO | WO 92/09576 | 6/1992 |
| WO | WO 92/11241 | 7/1992 |
| WO | WO 97/04039 | 2/1997 |
| WO | WO 97/12355 | 4/1997 |

OTHER PUBLICATIONS

Nito et al, "A Novel Surface–Stabilized Monostable Ferroelectric LCD", Journel of the SID. 1/2, 1993, pp. 163–169, also referred to as XP 002117907.

* cited by examiner

Primary Examiner—Shean C. Wu
(74) Attorney, Agent, or Firm—Frommer Lawrence & Haug LLP

(57) ABSTRACT

In a monostable ferroelectric active matrix display comprising a liquid-crystal layer in the form of a monodomain having an unambiguously defined direction of the layer normals z of the smC* phase, the layer normals z and the preferential direction n of the nematic or cholesteric phase (N* phase) form an angle of more than 5°.

9 Claims, No Drawings

MONOSTABLE FERROELECTRIC ACTIVE MATRIX DISPLAY

BACKGROUND OF THE INVENTION (1). Field of the Invention

Replacement of the cathode ray tube with a flat panel screen requires a display technology which simultaneously makes it possible to achieve a high image resolution, i.e. more than 1000 lines, a high image brightness (>200 cd/m$^2$), a high contrast (>100:1), a high frame rate (>60 Hz), an adequate color representation (>16 million colors), a large image format (screen diagonal>40 cm), a low power consumption and a wide viewing angle, at low production costs. At present, there is no technology which fully satisfies all these features simultaneously.

(2). Description of Related Art

Many manufacturers have developed screens which are based on nematic liquid crystals and have been used in recent years in the field of notebook PCs, personal digital assistants, desktop monitors etc. Use is made here of the technologies STN (supertwisted nematics), AM-TN (active matrix—twisted nematics) AM-IPS (active matrix—in-plane switching) and AM-MVA (active matrix—multidomain vertically aligned), which are described in detail in the relevant literature; see, for example, T. Tsukuda, TFT/LCD: Liquid Crystal Displays Addressed by Thin-Film Transistors, Gordon and Breach, 1996, ISBN 2-919875-01-9, and the references cited therein; SID Symposium 1997, ISSN-0097-966X pages 7 to 10, 15 to 18, 47 to 51, 213 to 216, 383 to 386, 397 to 404 and the references cited therein. Furthermore, use is being made of the technologies PDP (plasma display panel), PALC (plasma addressed liquid crystal), ELD (electroluminescent display), FED (field emission display) etc., which are also explained in the above-cited SID report.

Clark and Lagerwall (U.S. Pat. No. 4,367,924) have been able to show that the use of ferroelectric liquid crystals (FLCs) in very thin cells results in opto-electrical switching or display elements which have response times which are faster by a factor of up to 1000 compared with conventional TN ("twisted nematic") cells (see, for example, EP-A 0 032 362). Owing to this and other favorable properties, for example the possibility of bistable switching and the fact that the contrast is virtually independent of the viewing angle, FLCs are basically suitable for areas of application such as computer displays and TV sets, as shown by a monitor marketed in Japan by Canon since May 1995.

The use of FLCs in electro-optical or fully optical components requires either compounds which form smectic phases and are themselves optically active, or the induction of ferroelectric smectic phases by doping compounds which, although forming such smectic phases, are not themselves optically active, with optically active compounds. The desired phase should be stable over the broadest possible temperature range, and in addition the phase should have high resistance and voltage retaining ability values.

The individual pixels of an LC display are usually arranged in an x,y matrix formed by the arrangement of a series of electrodes (conductor tracks) along the rows and a series of electrodes along the columns on the upper or lower side of the display. The points of intersection of the horizontal (row) electrodes and the vertical (column) electrodes form addressable pixels.

This arrangement of the pixels is usually referred to as a passive matrix. For addressing, various multiplex schemes have been developed, as described, for example, in Displays 1993, Vol. 14, No. 2, pp. 86–93, and Kontakte 1993 (2), pp. 3–14. Passive matrix addressing has the advantage of simpler display production and consequently low production costs, but the disadvantage that passive addressing can only be carried out line by line, which results in the addressing time for the entire screen with N lines being N times the line addressing time. For usual line addressing times of about 50 microseconds, this means a screen addressing time of about 60 milliseconds in, for example, the HDTV (high-definition TV, 1152 lines) standard, i.e. a maximum frame rate of about 16 Hz, too slow for moving images. In addition, display of gray shades is difficult. At the FLC Conference in Brest, France (Jul. 20–24, 1997, see Abstract Book $6^{th}$ International Conference on Ferroelectric Liquid Crystals, Brest/France), a passive FLC display with digital gray shades was shown by Mizutani et al., in which each of the RGB pixels (RGB=red, green, blue) was divided into sub-pixels, allowing the display of gray shades in digital form through partial switching. Using three basic colors (red, green, blue), N gray shades result in $3^N$ colors. The disadvantage of this method is the considerable increase in the number of screen drivers necessary and thus in the costs. In the case of the display shown in Brest, three times as many drivers were necessary as in a standard FLC display without digital gray shades.

In so-called active matrix technology (AMLCD), a non-structured substrate is usually combined with an active matrix substrate. An electrically non-linear element, for example a thin-film transistor, is integrated into each pixel of the active matrix substrate. The nonlinear elements can also be diodes, metal-insulator-metal and similar elements, which are advantageously produced by thin-film processes and are described in the relevant literature; see, for example, T. Tsukuda, TFT/LCD: Liquid Crystal Displays Addressed by Thin-Film Transistors, Gordon and Breach, 1996, ISBN 2-919875-01-9, and the references cited therein.

Active matrix LCDs are usually operated with nematic liquid crystals in TN (twisted nematics), ECB (electrically controlled birefringence), VA (vertically aligned) or IPS (in-plane switching) mode. In each case, the active matrix generates an electric field of individual strength on each pixel, producing a change in alignment and thus a change in birefringence, which is in turn visible in polarized light. A severe disadvantage of these processes is the poor video capability owing to excessively slow response times of nematic liquid crystals.

For this and other reasons, liquid crystal displays based on a combination of ferroelectric liquid crystal materials and active matrix elements have been proposed, see for example WO 97/12355, or Ferroelectrics 1996, 179,141–152, W. J. A. M. Hartmann, IEEE Trans. Electron. Devices 1989, 36 (9; Pt. 1), 1895–9, and dissertation, Eindhoven, The Netherlands, 1990.

Hartmann utilized a combination of the so-called "quasi-bookshelf geometry" (QBG) of an FLC and a TFT (thin-film transistor) active matrix to simultaneously achieve high response speed, gray shades and high transmission. However, the QBG is not stable over a broad temperature range, since the temperature dependence of the smectic layer thickness disrupts or rotates the field-induced layer structure. Moreover, Hartmann utilizes an FLC material having a spontaneous polarization of more than 20 nC/cm$^2$, which, for pixels having realistic dimensions of, for example, an area of 0.01 mm$^2$, leads to high electric charges (at saturation, Q=2AP, A=pixel area, P=spontaneous polarization). With low-cost amorphous silicium TFTs, for example, these high charges cannot reach the pixel in the course of the opening time of the TFT. For these reasons, this technology has not been pursued any further to date.

While Hartmann utilizes the charge-controlled bistability to display a virtually continuous gray scale, Nito et al. have suggested a monostable FLC geometry (see Journal of the SID, 1/2, 1993, pages 163–169) in which the FLC material is aligned by means of relatively high voltages such that only a single stable position results from which a number of intermediate states are generated by application of an electric field via a thin-film transistor. These intermediate states correspond to a number of different brightness values (gray shades) when the cell geometry is matched between crossed polarizers.

One disadvantage of this technique is the occurrence of a streaky texture in the display which limits contrast and brightness of this cell (see FIG. 8 in the abovementioned citation). While it is possible to correct the disadvantageous streaky texture by treatment with a high electric voltage (20–50 V) in the nematic or cholesteric phase (see page 168 of the abovementioned citation), such a field treatment is unsuitable for mass production of screens and usually does not result in temperature-stable textures. Furthermore, this method produces switching only in an angle range of up to a maximum of once the tilt angle, which is about 22° in the case of the material used by Nito et al. (cf. p. 165, FIG. 6) and thus produces a maximum transmission of only 50% of the transmission of two parallel polarizers.

The object of the present invention is to provide a ferroelectric active matrix liquid crystal display comprising a ferroelectric liquid-crystal mixture, where the liquid-crystal mixture assumes a monostable position, but without forming a streaky texture, is temperature-stable and makes it possible to achieve a very high maximum transmission and a very high contrast, and it should furthermore exhibit favorable resistance and voltage retaining ability values.

BRIEF SUMMARY OF THE INVENTION

This object is achieved according to the invention by a monostable ferroelectric active matrix display comprising a liquid-crystal layer in the form of a monodomain having an unambiguously defined direction of the layer normal z of the smC* phase, wherein the layer normal z and the preferential direction n of the nematic or cholesteric phase (N* phase) form an angle of more than 5°, where the liquid-crystal layer comprises at least one compound of the formula (I)

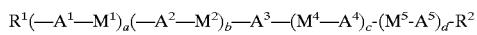

where:
$A^3$ is a fluorinated mono-, di- or trinuclear nitrogen-containing aromatic, $R^1$ and $R^2$ are, independently of one another, identical or different and are each hydrogen or an alkyl or alkyloxy radical having 2–16 carbon atoms, preferably 2–12 carbon atoms, where one or two —$CH_2$— groups may be replaced by —CH=CH—, —OC(=O)—, —(O=)C—O—, —Si($CH_3$)$_2$— or cyclopropane-1,2-diyl and one or more H atoms may be replaced by F with the proviso that $R^1$ and $R^2$ cannot both be hydrogen or the group $M^7$-$R^7$ where $R^7$ is a group having at least one asymmetric carbon atom which is either part of an alkyl group having 3–16 carbon atoms, referably 3–12 carbon atoms, where one to four, preferably one or two, —$CH_2$— groups may be replaced by —O—, —OC(=O)— or —(O=)C—O— and one of the substituents of the asymmetric carbon atom must be —$CH_3$— $CF_3$—$OCH_3$, Cl, CN or F, or part of a 3- to 7-membered carbocycle, where one or two nonadjacent —$CH_2$— groups may be replaced by —O— or one —$CH_2$— group may be replaced by —OC(=O)— or —(O=)C—O—, where $M^7$ is a single bond, if the asymmetric carbon atom is part of an alkyl chain, and a single bond, —$OCH_2$—, —$CH_2O$—, —OC(=O)— or —C(=O)O—, if the asymmetric carbon atom is part of the carbocycle defined under $R^7$ $A^1$, $A^2$, $A^4$ and $A^5$ are, independently of one another, identical or different and are each 1,4-phenylene, unsubstituted, monosubstituted or disubstituted by F or Cl, 1,3-phenylene, unsubstituted, monosubstituted or disubstituted by F, cyclohex-1-ene-1,4-diyl, cyclohex-2-ene-1,4-diyl, 1-alkyl-1-sila-cyclohexane-1,4-diyl, bicyclo[2.2.2]octane-1,4-diyl, indane-2,6-diyl or naphthalene-2,6-diyl $M^1$, $M^2$, $M^4$ and $M^5$ are, independently of one another, identical or different and are each a single bond, —OC(=O)—, —(O=)C—O—, —$OCH_2$—, —$CH_2$—O—, —$CH_2CH_2$—, —$CH_2CH_2CH_2CH_2$— or —C≡C— a, b, c and d are each zero or 1 with the proviso that $1 \leq$ the understanding that ($A^x$-$M^x$) is a single bond when the corresponding index is zero.

BRIEF DESCRIPTION OF THE SEVERAL VIEWS OF THE DRAWING(S)

Not Applicable

DETAILED DESCRIPTION OF THE INVENTION

The active matrix FLCD of the invention preferably comprises, as optically active layer, a ferroelectric liquid-crystalline medium (liquid-crystal phase) having a phase sequence of isotropic—nematic or cholesteric (N*)—smectic C* or a phase sequence of isotropic-nematic or cholesteric (N*)—smectic A*—smectic C*, where the smectic A phase has a width of not more than 2 K, preferably not more than 1 K, particularly preferably not more than 0.5 K. The asterisk (*) attached to the phase name indicates a chiral phase.

The fluorinated nitrogen-containing aromatics are preferably a fluorinated pyridine, a fluorinated pyrimidine, a fluorinated pyrazine, a fluorinated azanaphthalene, a fluorinated azatetrahydronaphthalene or a fluorinated azaphenanthrene.

Particular preference is given to the fluorinated nitrogen-containing aromatics of the types

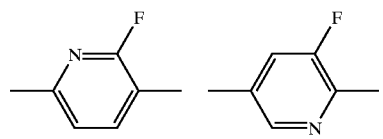

-continued

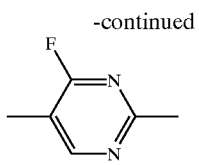

The liquid-crystalline medium of the active matrix FLCD of the invention preferably comprises 0.05–80% of one or more of the fluorinated nitrogen-containing aromatics, particularly preferably 5–70% of one or more of the fluorinated nitrogen-containing aromatics.

The displays are preferably produced by a process, which comprises introducing the liquid-crystal layer into the space between a rubbed upper substrate plate and a rubbed lower substrate plate of the active matrix display, the rubbing directions on the upper substrate plate and the lower substrate plate being essentially parallel, and cooling the liquid-crystal phase from the isotropic phase, an electric direct current being applied to the display at least during the N*→smC* or N*→smA*→smC* phase transition.

The FLC mixture is filled into an active matrix display. Production and components of an AM display of this type are described in detail in the above-cited Tsukuda reference. However, in contrast to nematic displays, the thickness of the FLC layer is only from 0.7 to 2,5 µm, preferably 1–2 µm. Moreover, the rubbing directions on upper and lower substrate plates are essentially parallel. The term "essentially parallel" includes antiparallel rubbing directions or rubbing directions which are weakly crossed, i.e. up to 10°.

It is important for the operation of this display that in the production of the display, during controlled cooling, a direct electric current, preferably of less than 5 V, is applied and maintained during the N*→smC* or N*→smA*→smC* phase transition, with the result that the whole display assumes a monostable monodomain which appears completely dark between crossed polarizers.

Once this domain has been obtained, the direct current is switched off. In contrast to the abovementioned approach by Hartmann or conventional bistable FLCDs, the resulting texture is monostable. This means that the preferred n director (which indicates the preferential direction of the long axes of the molecules) is in the rubbing direction of the cell, whereas the z director (which indicates the preferential direction of the smectic layer normal) is oblique relative to the rubbing direction by approximately the tilt angle value. This configuration is exactly the opposite of the conventional bistable cell according to Clark and Lagerwall in which the z director is in the rubbing direction.

In contrast to Nito's approach, this is exactly the orientation in which there are no two layer normals, and thus no two orientation domains, which ultimately lead to the unwanted streaky texture described above, but a single unambiguous direction of the z director and thus a single monodomain only. Furthermore, it is possible to obtain twice the tilt angle, which leads to 100% transmission, based on parallel polarizers, i.e. double brightness is achieved.

The display thus obtained appears completely dark at a suitable angle of rotation between crossed polarizers. On applying an addressing voltage of only a few volts, the display appears bright, it being possible to vary the brightness continuously by means of the voltage, and, when saturated, is almost as bright as two parallel polarizing films. The angle between the preferential direction of the nematic (or cholesteric) phase and the layer normal (z director) is ideally and thus preferably equal to the tilt angle of the smectic phase, or at least essentially equal to the tilt angle.

For the purposes of the invention, "essentially" means preferably a range from half the tilt angle to the full tilt angle, particularly preferably from 0.8 to 1.0 times the tilt angle, but at least 5°.

The ferroelectric active matrix liquid crystal display of the invention is particularly useful in practice, in particular for TV, HDTV or multimedia, since it combines high transmission, short response times, gray scale and thus full color capability, low-cost production and a broad temperature range. Furthermore, the display can be operated at voltages of ≦10 volts, preferably of ≦8 V, particularly preferably of ≦5 V.

The spontaneous polarization of the active matrix FLCD of the invention is generally less than 20 nC/cm², preferably less than 15 nC/cm², more preferably in the range of from 0.01 to 10 nC/cm², at the operating temperature of the display.

The length of the chiral nematic or cholesteric pitch in the liquid-crystal layer is preferably more than 50 µm within a temperature range of at least 5° C. above the smectic phase transition or, if the range of existence of the N* phase is less than 5° C., within a temperature range of at least 80% of this range of existence.

The displays may be used for example in the TV, HDTV or multimedia areas or in the area of information processing, e.g. in notebook PCs, personal digital assistants or desktop monitors.

In particular, the term "active matrix display" as used herein includes an LCD in which one of the two substrates is replaced by the rear side of an IC chip (IC=integrated circuit) as described, for example, in D. M. Walba, Science 270, 250–251 (1993) or http://www.displaytech.com.

It has been found that fluorinated nitrogen-containing aromatics meet the requirements described at the beginning and are thus suitable for use as components of high-resistance ferroelectric liquid-crystal mixtures for active matrix FLCDs.

The invention furthermore provides 2-fluoropyridine derivatives of the formula (II)

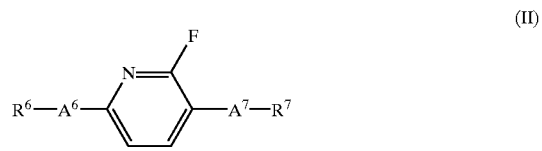

(II)

where the symbols and indices are as defined below:
$R^6$ and $R^7$ are identical or different and are each a straight-chain or branched alkyl radical (with or without asymmetric carbon atoms) having 1 to 20 carbon atoms;
$A^6$ is 1,4-phenylene, 1,1'-biphenyl-4,4'-diyl or a single bond;
$A^7$ is 1,4-phenylene, 1,1'-biphenyl-4,4'-diyl or a single bond, with the provisos that
  a) $A^7$ is 1,4-phenylene when $A^6$ is 1,4-phenylene
  b) $A^7$ is 1,1'-biphenyl-4,4'-diyl when $A^6$ is a single bond
  c) $A^7$ is a single bond when $A^6$ is 1,1'-biphenyl-4,4'-diyl.

The symbols and indices in the formula (II) are preferably as defined below:
$R^6$ and $R^7$ are preferably identical or different and are each a straight-chain or branched alkyl radical having 3 to 18 carbon atoms.
$R^6$ and $R^7$ are particularly preferably identical or different and are each a straight-chain alkyl radical having 5 to 16 carbon atoms.

Particular preference is given to the following compounds of the formula (II-1) to (II-3):

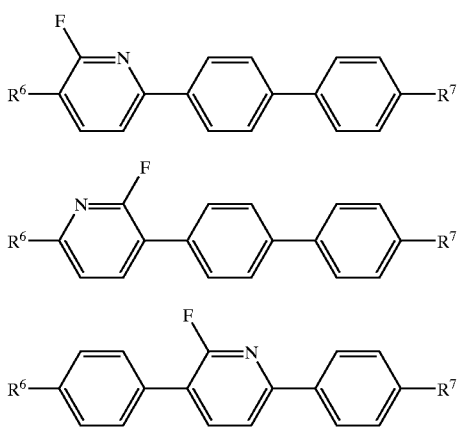

where $R^6$ and $R^7$ have the abovementioned meanings and preferences.

The methods for preparing mixtures of the invention are known in principle:

For fluorinated pyridines, e.g. JP-B-2079059, U.S. Pat. No. 5,389,291, U.S. Pat. No. 5,630,962, U.S. Pat. No. 5,445,763, DE-A 44 27 199.

For fluorinated pyrimidines, e.g. U.S. Pat. No. 5,344,585, EP-B 0 158 137.

For fluorinated pyrazines, e.g. U.S. Pat. No. 5,562,859.

For fluorinated azanaphthalenes, fluorinated azatetrahydronaphthalenes and fluorinated azaphenanthrenes (Id), e.g. DE-A 195 17 056, DE-A 195 17 060, DE-A 196 53 009, DE-A 195 38 404.

The examples which follow illustrate the invention.

EXAMPLES

Example 1

The particular suitability of the compounds of the invention for use as components of ferroelectric liquid-crystal mixtures for active matrix displays is demonstrated by the measurements below, in which the compounds of the invention are tested in comparison to other components which have also been suggested as components of ferroelectric liquid-crystal mixtures.

The resistance of the following components is measured using an appropriate measurement set-up.

a) 2-(4-octyloxyphenyl)-5-octylpyrimidine (synthesis in accordance with DD-WP 95892, purification in accordance with Nagashima et al., Liq. Crystals 1997, vol. 4, pp. 537–546)

b) 5-butyloxy-2-[4-(octyloxy-2,3-difluorophenyl)phenyl] pyrimidine (synthesis/purification in accordance with EP-B 0 332 006)

c) 2-octyl-6-(5-nonylpyrimidin-2-yl)indane (synthesis/ purification in accordance with EP-A 0 546 338)

d) compound in accordance with (Ia1) 6-(4-cyclohexylphenyl)-2-fluoro-3-(4-octyloxyphenyl) pyridine (synthesis/purification in accordance with U.S. Pat. No. 5,630,962)

e) compound in accordance with (Ib1) 4-fluoro-5-octyloxy-(2-4-octyloxyphenyl)pyrimidine (synthesis/ purification in accordance with U.S. Pat. No. 5,344, 585)

TABLE 1

|  | a | b | c | d | e |
|---|---|---|---|---|---|
| Resistance [T ohm] | 0.2 | 0.3 | 0.7 | 1.9 | 2.4 |

Table 1 demonstrates the particular suitability of the compounds of the invention for forming ferroelectric liquid-crystal mixtures for active matrix displays since it is possible with the materials of the invention to achieve higher resistance values by standard operations; thus mixtures having a favorable voltage retaining ability can be obtained.

The ferroelectric liquid-crystal mixtures can be obtained either exclusively from the compounds of the invention or by admixing other components customary for FLC mixtures.

Example 2

A chiral smectic liquid-crystal mixture consisting of [by weight]

| | |
|---|---|
| 2-(4-decyloxyphenyl)-5-octylpyrimidine | 12.6% |
| 2-(4-octyloxyphenyl)-5-octylpyrimidine | 15.9% |
| 2-(4-hexyloxyphenyl)-5-octylpyrimidine | 16.5% |
| 2-(2,3-difluoro-4-heptyloxyphenyl)-5-nonylpyrimidine | 7.0% |
| 2-(2,3-difluoro-4-octyloxyphenyl)-5-nonylpyrimidine | 7.0% |
| 2-(2,3-difluoro-4-nonyloxyphenyl)-5-nonylpyrimidine | 7.0% |
| 2-(4'-propylbiphenyl-4-yl)-5-octylpyrimidine | 12.5% |
| 4-(9-octyloxypyrimidin-2-yl)phenyl (2R,3R)-3-propyloxiranecarboxylate | 1.5% | is admixed with 20% of the compound 2-fluoro-6-(4-nonylphenyl)-3-(4-pentylphenyl)pyridine resulting in a chiral smectic liquid-crystal mixture having the phase sequence I 82.0–78.1 N* 68.6 $S_C^*$.

This mixture is tested for its electro-optical properties in a test cell. The test cell has an electrode distance of 1.3 μm (micrometer), the indium-tin oxide (ITO) electrodes are provided with an LQT-120 alignment layer available from Hitachi Chemicals.

First, the transmission/voltage diagram is determined. To this end, To this end, the filled test cell is aligned by cooling it down, a direct voltage of 3 volts being applied in the the temperature range from 80° C. to 70° C., which results in the formation of a monostable monodomain which appears completely dark in a polarizing microscope between crossed polarizers at the optimum angle of rotation. The electro-optical behavior of the cell is now investigated by means of monopolar and square-wave addressing pulses.

First monopolar voltage pulses of 10 ms duration are applied, and the transmission is measured as a function of voltage. The following result is

| Voltage [V] | Transmission [% of transmission of two parallel polarizers] |
|---|---|
| 0 | 0 |
| 1 | 3.4 |
| 1.5 | 7.6 |
| 2 | 13.8 |
| 2.5 | 23.6 |
| 3 | 43.4 |
| 3.5 | 60.6 |
| 4 | 67 |
| 5 | 72 |

-continued

| Voltage [V] | Transmission [% of transmission of two parallel polarizers] |
|---|---|
| 8 | 77 |
| 10 | 78.6 |

The measurements give a tilt angle of about 54.1° (2Θ, ±20 V, 60 Hz) and a deviation Δ of the layer normal z from the preferential direction n of 10.9°.

Example 3

A mixture as in Example 2, which comprises 20% of 2-fluoro-6-(4-octyloxyphenyl)pyridin-3-yl octanoate instead of 2-fluoro-6-(4-nonylphenyl)-3(4pentylphenyl)pyridine, gives the following measured values:

| Voltage [V] | Transmission [% of transmission of two parallel polarizers] |
|---|---|
| 0 | 0 |
| 1 | 2.4 |
| 1.5 | 14.8 |
| 2 | 32.2 |
| 2.5 | 46 |
| 3 | 52.4 |
| 3.5 | 56.2 |
| 4 | 59 |
| 5 | 62.6 |
| 8 | 70.2 |
| 10 | 74.2 | and a tilt angle (2Θ, ±20 V, 60 Hz) of about 60.5°, Δ of 22.5° and the phase sequence I 69.8–67.8 N* 58.7 $S_C^*$.

Example 4

A mixture as in Example 2, which comprises 20% of 3-decyl-2-fluoro-6-(4-octyloxphenyl)pyridine instead of 2-fluoro-6-(4-nonylphenyl)-3'-(4-pentylphenyl)pyridine, gives the following measured values: I 68.0–66.0 N* 60.0 $S_C^*$.

| Voltage [V] | Transmission [% of transmission of two parallel polarizers] |
|---|---|
| 0 | 0 |
| 1 | 11.4 |
| 1.5 | 19.2 |
| 2 | 32.8 |
| 2.5 | 49.4 |
| 3 | 59 |
| 3.5 | 63.6 |
| 4 | 65.8 |
| 5 | 69 |
| 8 | 72.4 |
| 10 | 73 | and a tilt single (2Θ, ±20 V, 60 Hz) of 51.3° and Δ of about 16.1°.

Example 5

A mixture as in Example 2, which comprises 20% of 4-(3-fluoro-5-octyloxypyridin-2-yl)phenyl trans-4-pentylcyclohexanecarboxylate instead of 2-fluoro-6-(4-nonylphenyl)-3-(4-pentylphenyl)pyridine, has the phase sequence I 84.7–82.3 N* 50.7 $S_C^*$, a Δ value of 5.4° and a transmission of about 70% (5 V, 60 Hz) of the transmission of two parallel polarizers.

These examples demonstrate the continuous gray scale of the displays of the invention.

Example 6

2-Fluoro-3-nonyl-6-(4-heptyl-1,1'-biphen-4'-yl)pyridine

A mixture of 16.2 g of 4-heptylbiphenyl-4'-ylboronic acid [159381-67-6], 8.8 g of 2-bromo-6-fluoropyridine, 10.6 g of sodium carbonate, 0.6 g of tetrakis(triphenylphosphine)palladium(0), 500 ml of toluene, 250 ml of ethanol and 125 ml of water is refluxed until the reaction is complete. The mixture is cooled, the phases are separated and the organic layer is washed, dried and evaporated to dryness under reduced pressure. After purification by column chromatography (silica gel; dichloromethane/heptane 1:1) and recrystallization from heptane, 11.3 g of 2-fluoro-6-(4-heptylbiphenyl-4'-yl)pyridine are obtained as colorless crystals of m.p. 117° C., cl.p.135° C.

A solution of 10.7 g of this product in 250 ml of tetrahydrofuran are added dropwise to 1.1 equivalents of lithium diisopropylamide (in tetrahydrofuran) at a temperature of less than −60° C. A solution of 6.8 g of pelargonaldehyde in 20 ml of tetrahydrofuran is then added and the reaction mixture is brought to room temperature overnight. The mixture is hydrolyzed with 1 l of ice-water/hydrochloric acid and extracted with tert-butyl methyl ether, the extract is washed with saturated sodium chloride solution and evaporated to dryness under reduced pressure. The 1-[2-fluoro-4-(4-heptylbiphenyl-4'-yl)pyridin-3-yl]nonan-1-ol residue is admixed with 300 ml of toluene and 0.4 g of 4-toluenesulfonic acid hydrate and heated with azeotropic removal of the water of reaction; after removal of the solvent by distillation and purification by column chromatography (silica gel; heptane/dichloromethane 2:1), 5.3 g of 1-[2-fluoro-6-(4'-heptylbiphenyl-4'-yl)pyridin-3-yl]non-1-ene are obtained.

This substance is dissolved in 150 ml of tetrahydrofuran, admixed with 0.5 g of palladium (10%/C) and hydrogenated at room temperature and atmospheric pressure. After filtration, removal of the solvent by distillation, purification by chromatography (silica gel; heptane/dichloro-methane 1:1) and recrystallization from acetonitrile, 3.4 g of the target compound, phase sequence X 87 $S_3$ 94 $S_2$ 132 $S_C$ 163 I, are obtained.

The following compounds can be obtained in a similar manner:

2-fluoro-3-nonyl-6-(4-pentyl-1,1'-biphen-4'-yl)pyridine
2-fluoro-6-(4-hexyl-1,1'-biphen-4'-yl)-3-nonylpyridine
2-fluoro-3-nonyl-6-(4-octyl-1,1'-biphen-4'-yl)pyridine
2-fluoro-3-octyl-6-(4-pentyl-1,1'-biphen-4'-yl)pyridine
2-fluoro-6-(4-hexyl-1,1'-biphen-4'-yl)-3-octylpyridine
2-fluoro-6-(4-heptyl-1,1'-biphen-4'-yl)-3-octylpyridine
2-fluoro-3-octyl-6-(4-octyl-1,1'-biphen-4'-yl)pyridine
2-fluoro-3-heptyl-6-(4-pentyl-1,1'-biphen-4'-yl)pyridine
2-fluoro-3-heptyl-6-(4-hexyl-1,1'-biphen-4'-yl)pyridine
2-fluoro-3-heptyl-6-(4-heptyl-1,1'-biphen-4'-yl)pyridine
2-fluoro-3-heptyl-6-(4-octyl-1,1'-biphen-4'-yl)pyridine
2-fluoro-3-heptyl-6-(4-nonyl-1,1'-biphen-4'-yl)pyridine
2-fluoro-3-hexyl-6-(4-pentyl-1,1'-biphen-4'-yl)pyridine 2-fluoro-3-hexyl-6-(4-hexyl-1,1'-biphen-4'-yl)pyridine
2-fluoro-6-(4-heptyl-1,1'-biphen-4'-yl)-3-hexylpyridine
2-fluoro-3-hexyl-6-(4-octyl-1,1'-biphen-4'-yl)pyridine
2-fluoro-3-hexyl-6-(4-nonyl-1,1'-biphen-4'-yl)pyridine
2-fluoro-6-(4-hexyl-1,1'-biphen-4'-yl)-3-pentylpyridine
2-fluoro-6-(4-heptyl-1,1'-biphen-4'-yl)-3-pentylpyridine
2-fluoro-6-(4-octyl-1,1'-biphen-4'-yl)-3-pentylpyridine
2-fluoro-6-(4-nonyl-1,1'-biphen-4'-yl)-3-hexylpyridine
3-decyl-2-fluoro-6-(4-pentyl-1,1'-biphen-4'-yl)pyridine
3-decyl-2-fluoro-6-(4-hexyl-1,1'-biphen-4'-yl)pyridine
3-decyl-2-fluoro-6-(4-heptyl-1,1'-biphen-4'-yl)pyridine
3-decyl-2-fluoro-6-(4-octyl-1,1'-biphen-4'-yl)pyridine
3-decyl-2-fluoro-6-(4-nonyl-1,1'-biphen-4'-yl)pyridine Example 7

2-Fluoro-3-(4-heptylphenyl)-6-(4-nonylphenyl)pyridine

4-Nonylphenylboronic Acid

A solution of the Grignard compound prepared from 0.55 mol of magnesium and 0.37 mol of 1-bromo-4-nonylbenzene in 550 ml of dry tetrahydrofuran is added dropwise to a solution of 0.4 mol of trimethyl borate in 400 ml of dry tetrahydrofuran at 0° C. under a protective gas atmosphere. The mixture is stirred for an additional 2.5 h at this temperature. Then 600 ml of 10% stength hydrochloric acid are added and the resulting mixture is stirred at room temperature for 30 min. After addition of 120 g of sodium chloride, the reaction mixture is extracted with tert-butyl methyl ether, the combined organic extracts are washed with saturated sodium chloride solution and dried with magnesium sulfate. The solvent is removed under reduced pressure and the raw product is recrystallized from acetonitrile, giving 72 g (79%) of 4-nonylphenylboronic acid.

The following compounds can be obtained in a similar manner:

4-propylphenylboronic acid [134150-01-9]
4-butylphenylboronic acid [145240-28-4]
4-pentylphenylboronic acid [121219-12-3]
4-hexylphenylboronic acid [105365-50-2]
4-heptylphenylboronic acid
4-octylphenylboronic acid [133997-05-4]
4-decylphenylboronic acid [170981-25-6]
4-undecylphenylboronic acid [210368-94-8]
4-dodecylphenylboronic acid [206763-93-1]

2-Fluoro-6-(4-nonylphenyl)pyridine

A solution of 232 mmol of 2-bromo-6-fluoropyridine in 400 ml of toluene is admixed with 290 mmol of 4-nonylphenylboronic acid, 200 ml of ethanol, a solution of 464 mmol of sodium carbonate in 200 ml of water and 2.3 mmol of tetrakis(triphenylphosphine)palladium(0) at room temperature. The mixture is heated at the boil for 3.5 h. After cooling, the phases are separated, the aqueous phase is extracted with dichloromethane and the combined organic phases are dried with magnesium sulfate. The solvents are removed under reduced pressure and the raw product is purified by column chromatography over silica gel 60 using n-heptane/dichloro-methane 1:1 as eluent and recrystallization from acetonitrile/acetone 5:1, giving 63 g (91%) of 2-fluoro-6-(4-nonylphenyl)pyridine.

The following compounds can be obtained in a similar manner:

2-fluoro-6-(4-propylphenyl)pyridine
6-(4-butylphenyl)-2-fluoropyridine
2-fluoro-6-(4-pentylphenyl)pyridine
2-fluoro-6- (4-hexylphenyl) pyridine
2-fluoro-6-(4-heptylphenyl)pyridine
2-fluoro-6-(4-octylphenyl)pyridine [155466-91-4]
6-(4-decylphenyl)-2-fluoropyridine
6-(4-undecylphenyl)-2-fluoropyridine
6-(4-dodecylphenyl)-2-fluoropyridine 2-Fluoro-6-(4-nonylphenyl)pyridine-3-boronic Acid A solution of 100 mol of 2-fluoro-6-(4-nonylphenyl)pyridine in 500 ml of dry THF is added dropwise to a solution of 110 mmol of lithium diisopropylamide in 100 ml of dry tetrahydrofuran at −70° C. under a protective gas atmosphere. The mixture is stirred for an additional 4 h at this temperature. A solution of 200 mmol of trimethyl borate in 40 ml of dry tetrahydrofuran is then added dropwise at a temperature of less than −60° C. The reaction mixture is then slowly warmed up to room temperature, admixed with a solution of 60 ml of water and 20 ml of concentrated hydrochloric acid while cooling with ice, and stirred for another hour at room temperature. The reaction mixture is extracted with tert-butyl methyl ether, the combined organic extracts are washed with water and saturated sodium chloride solution and dried with sodium sulfate, and the solvents are removed under reduced pressure. The raw product is crystallized from n-heptane/acetone 4:1, giving 19.8 g (58%) of 2-fluoro-6-(4-nonylphenyl)pyridine-3-boronic acid.

The following compounds can be obtained in a similar manner:

2-fluoro-6-(4-propylphenyl)pyridine-3-boronic acid
6-(4-butylphenyl)-2-fluoropyridine-3-boronic acid
2-fluoro-6-(4-pentylphenyl)pyridine-3-boronic acid
2-fluoro-6-(4-hexylphenyl)pyridine-3-boronic acid
2-fluoro-6-(4-heptylphenyl)pyridine-3-boronic acid
2-fluoro-6-(4-octylphenyl)pyridine-3-boronic acid
6-(4-decylphenyl)-2-fluoropyridine-3-boronic acid
6-(4-undecylphenyl)-2-fluoropyridine-3-boronic acid
6-(4-dodecylphenyl)-2-fluoropyridine-3-boronic acid A solution of 40 mmol of 1-bromo-4-pentylbenzene in 90 ml of toluene is admixed with 44 mmol of 2-fluoro-6-(4-nonylphenyl)pyridine-3-boronic acid, 45 ml of ethanol, a solution of 80 mmol of sodium carbonate in 45 ml of water and 0.4 mmol of tetrakis(triphenylphosphine)palladium(0) at room temperature. The mixture is heated at the boil for 5 h. After cooling, the phases are separated, the aqueous phase is extracted with tert-butyl methyl ether and the combined organic phases are washed with water and saturated sodium chloride solution and dried with magnesium sulfate. The solvents are then removed under reduced pressure and the raw product is purified by column chromatography over silica gel 60 using n-heptane/dichloromethane 1:1 as eluent and recrystallization from acetonitrile/acetone 1:1, giving 2-fluoro-6-(4-nonylphenyl)-3-(4-pentylphenyl)pyridine.

A solution of 48 mmol of 1-bromo-4-heptylbenzene in 155 ml of toluene is admixed with 48 mmol of 2-fluoro-6-(4-nonylphenyl)pyridine-3-boronic acid, 77 ml of ethanol, a solution of 96 mmol of sodium carbonate in 77 ml of water and 0.5 mmol of tetrakis(triphenylphosphine)palladium(0) at room temperature. The mixture is heated at the boil for 7 h. After cooling, the phases are separated, the aqueous phase is extracted with tert-butyl methyl ether and the combined organic phases are washed with water and saturated sodium chloride solution and dried with sodium sulfate. The solvents are then removed under reduced pressure and the raw product is purified by column chromatography over silica gel 60 using n-heptane as eluent and recrystallization from acetone, giving 8.9 g (39%) of 2-fluoro-3-(4-heptylphenyl)-6-(4-nonylphenyl)pyridine; X 42 $S_3$ 56 $S_C$ 136.1 $S_2$ 136.7 N 137 I.

The following compounds can be obtained in a similar manner:

2-fluoro-6-(4-nonylphenyl)-3-(4-pentylphenyl)pyridine; X 45 $S_3$ 39 $S_2$ 44 $S_C$ 127 N 140 I 2-fluoro-3-(4-hexylphenyl)-6-(4-nonylphenyl)pyridine 2-fluoro-6-(4-nonylphenyl)-3-(4-octylphenyl)pyridine 2-fluoro-3,6-bis-(4-nonylphenyl)pyridine 2-fluoro-3-(4-heptylphenyl)-6-(4-octylphenyl)pyridine 2-fluoro-3-(4-heptylphenyl)-6-(4-heptylphenyl)pyridine 2-fluoro-3-(4-heptylphenyl)-6-(4-hexylphenyl)pyridine 2-fluoro-3-(4-heptylphenyl)-6-(4-pentylphenyl)pyridine 2-fluoro-3-(4-heptylphenyl)-6-(4-butylphenyl)pyridine 2-fluoro-3-(4-heptylphenyl)-6-(4-propylphenyl)pyridine 2-fluoro-3-(4-nonylphenyl)-6-(4-pentylphenyl)pyridine 2-fluoro-3-(4-nonylphenyl)-6-(4-hexylphenyl)pyridine 2-fluoro-3-(4-nonylphenyl)-6-(4-heptylphenyl)pyridine 2-fluoro-3-(4-nonylphenyl)-6-(4-octylphenyl)pyridine 2-fluoro-3-(4-nonylphenyl)-6-(4-nonylphenyl)pyridine 2-fluoro-3-(4-nonylphenyl)-6-(4-decylphenyl)pyridine Example 8

2-Fluoro-6-nonyl-3-(4-heptyl-1,1'-biphen-4'-yl)pyridine can be obtained in a Suzuki reaction as described in Example 1 from 4-bromo-4'-heptylbiphenyl [58573-93-6] and 2-fluoro-6-nonylpyridin-3-ylboronic acid [prepared from 2-fluoro-6-nonylpyridine by metallation as described in Example 1 and quenching with trimethyl borate as described in Example 2, the 2-fluoro-6-nonylpyridine being prepared by reacting 2-bromo-6-fluoropyridine with 1-nonyne, with catalysis by bis(triphenyl-phosphine)palladium(II) chloride, copper(I) iodide and triphenylphosphine, in triethylamine to give 1-(2-fluoropyridin-6-yl)nonyne followed by hydrogenation in tetrahydrofuran with palladium catalysis (10%/C) at room temperature and atmospheric pressure]. Work-up and purification are as described in Example 1.

The following compounds can be obtained in a similar manner:

2-fluoro-6-nonyl-3-(4-pentyl-1,1'-biphen-4'-yl)pyridine 2-fluoro-3-(4-hexyl-1,1'-biphen-4'-yl) -6-nonylpyridine 2-fluoro-6-nonyl-3-(4-octyl-1,1'-biphen-4'-yl)pyridine 2-fluoro-6-octyl-3-(4-pentyl-1,1'-biphen-4'-yl)pyridine 2-fluoro-3-(4-hexyl-1,1'-biphen-4'-yl) -6-octylpyridine 2-fluoro-3-(4-heptyl-1,1'-biphen-4'-yl)-6-octylpyridine 2-fluoro-6-octyl-3-(4-octyl-1,1'-biphen-4'-yl)pyridine 2-fluoro-6-heptyl-3-(4-pentyl-1,1'-biphen-4'-yl)pyridine 2-fluoro-6-heptyl-3-(4-hexyl-1,1'-biphen-4'-yl)pyridine 2-fluoro-6-heptyl-3-(4-heptyl-1,1'-biphen-4'-yl)pyridine 2-fluoro-6-heptyl-3-(4-octyl-1,1'-biphen-4'-yi)pyridine 2-fluoro-6-heptyl-3-(4-nonyl-1,1'-biphen-4'-yl)pyridine 2-fluoro-6-hexyl-3-(4-pentyl-1,1'-biphen-4'-yl)pyridine 2-fluoro-6-hexyl-3-(4-hexyl-1,1'-biphen-4'-yl)pyridine 2-fluoro-3-(4heptyl-1,1'-biphen-4-y)-6-hexylpyridine 2-fluoro-6-hexyl-3-(4-octyl-1,1'-biphen-4'-yl)pyridine 2-fluoro-6-hexyl-3-(4-nonyl-1,1'-biphen-4'-yl)pyridine 2-fluoro-3-(4-hexyl-1,1'-biphen-4'-yl)-6-pentylpyridine 2-fluoro-3-(4-heptyl-1,1'-biphen-4'-yl)-6-pentylpyridine 2-fluoro-3-(4-octyl-1,1'-biphen-4'-yl)-6-pentylpyridine 2-fluoro-3-(4-nonyl-1,1'-biphen-4'-yl)-6-pentylpyridine 6-decyl-2-fluoro-3-(4-pentyl-1,1'-biphen-4'-yl)pyridine 6-decyl-2-fluoro-3-(4-hexyl-1,1'-biphen-4'-yl)pyridine 6-decyl-2-fluoro-3-(4-heptyl-1,1'-biphen-4'-yl)pyridine 6-decyl-2-fluoro-3-(4-otyl-1,1'-biphen-4'-yl)pyridine 6-decyl-2-fluoro-3-(4-nonyl-1,1'-biphen-4'-yl)pyridine

What is claimed is:

1. A monostable ferroelectric active matrix display comprising a liquid-crystal layer in the form of a monodomain having an unambiguously defined direction of the layer normals z of the smC* phase, wherein the layer normals z and the preferential direction n of the nematic or cholesteric phase (N* phase) form an angle of more than 5°, where the liquid-crystal layer comprises at least one compound of the formula (I)

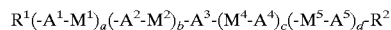

where:

$A^3$ is a mono-fluorinated, mono-, di- or trinuclear nitrogen containing aromatic, $R^1$ and $R^2$ are, independently of one another, identical or different and are each hydrogen or an alkyl or alkyloxy radical having 2–16 carbon atoms, where one or two —CH$_2$— groups may be replaced by —CH=CH—, —OC(=O)—, —O=)C—O—, —Si(CH$_3$)$_2$— or cyclopropane-1,2diyl and one or more H atoms may be replaced by F with the proviso that $R^1$ and $R^2$ cannot both be hydrogen or the group $M^7$-$R^7$ where $R^7$ is a group having at least one asymmetric carbon atom which is either part of an alkyl group having 3–16 carbon atoms, where one to four —CH$_2$— groups may be replaced by —O—, —OC(=O)— or —(O=)C—O— and one of the substituents of the asymmetric carbon atom must be —CH$_3$—CF$_3$—OCH$_3$, Cl, F or CN, or part of a 3- to 7-membered carbocycle, where one or two nonadjacent —CH$_2$— groups may be replaced by —O— or one —CH$_2$— group may be replaced by —OC(=O)— or —(O=)C—O—, where $M^7$ is a single bond, if the asymmetric carbon atom is part of an alkyl chain, and a single bond, —OCH$_2$—, —CH$_2$O—, —OC(=O)— or —C(=O)O—, if the asymmetric carbon atom is part of the carbocycle defined under $R^7$ $A^1$, $A^2$, $A^4$ and $A^5$ are, independently of one another, identical or different and are each 1,4-phenylene, unsubstituted, monosubstituted or disubstituted by F or Cl, 1,3-phenylene, unsubstituted, monosubstituted or disubstituted by F, cyclohex-1-ene-1,4-diyl, cyclohex-2ene-1,4-diyl, 1-alkyl-1-silacyclohexane-1,4-diyl, bicyclo[2.2.2]octane-1,4-diyl, indane-2,6diyl or naphthalene-2,6-diyl $M^1$, $M^2$, $M^4$ and $M^5$ are, independently of one another, identical or different and are each a single bond, —OC(=O)—, —(O=)C—O—, —OCH$_2$—, —CH$_2$—O—, —CH$_2$CH$_2$—, —CH$_2$CH$_2$CH$_2$CH$_2$— or —C≡C— a, b, c and d are each zero or 1 with the proviso that $1 \leq \{a+b+c+d\} \leq 3$ and the understanding that ($A^x$-$M^x$) is a single bond when the corresponding index is zero.

2. An active matrix display as claimed in claim 1 wherein $A^3$ is a mono-fluorinated pyridine, a mono-fluorinated pyrimidine, a mono-fluorinated pyrazine, a mono-fluorinated azanaphthalene, a mono-fluorinated azatetrahydronaphthalene or a monofluorinated azaphenanthrene.

3. An active matrix display as claimed in claim 1 wherein $A^3$ is

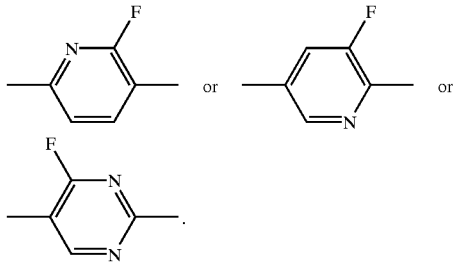

4. An active matrix display as claimed in claim 1 wherein the angle between the layer normals z of the smC* phase and the preferential direction n of the nematic or cholesteric phase (N* phase) is in the range from 0.5 to 1.0 times the smC* tilt angle.

5. An active matrix display as claimed in claim 1 wherein the ferroelectric liquid-crystal layer has a phase sequence I*-N*-smC* where an smA* phase having a range of existence of not more than 2° may exist between the N* phase and the smC* phase.

6. An active matrix display as claimed in claim 1 wherein the spontaneous polarization of the ferroelectric liquid-crystal phase is less than 25 nC/cm$^2$.

7. An active matrix display as claimed in claim 1 wherein the length of the chiral nematic or cholesteric pitch in the liquid-crystal layer is more than 50 μm within a temperature range of at least 2° C. above the smectic phase transition.

8. A process for producing an active matrix display as claimed in claim 1 which comprises introducing the liquid-crystal layer into the space between a rubbed upper substrate plate and a rubbed lower substrate plate of the active matrix display, the rubbing directions on the upper substrate plate and the lower substrate plate being essentially parallel, and cooling the liquid-crystal phase from the isotropic phase, an electric current being applied to the display at least during the N*→smC* or N*→smA*→smC* phase transition.

9. An active matrix display obtainable by the process as claimed in claim 8.

* * * * *